April 15, 1924.
S. L. GOKHALE
1,490,382
DIRECT READING FLUX METER
Filed July 30, 1920
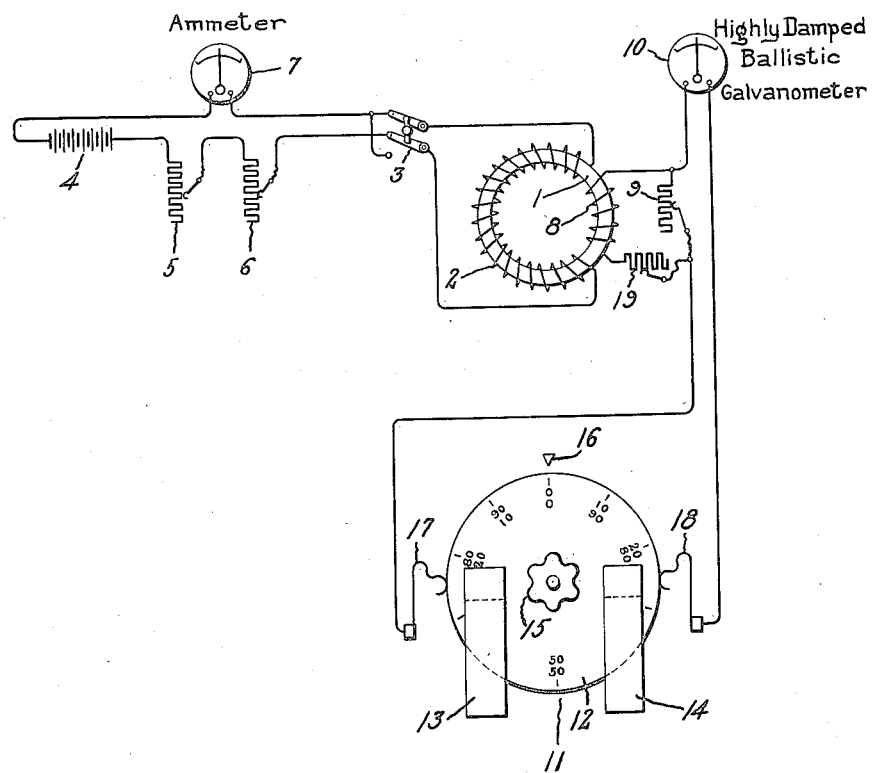
Inventor:
Shankar L. Gokhale,
by *Albert G. Davis*
His Attorney.

Patented Apr. 15, 1924.

1,490,382

UNITED STATES PATENT OFFICE.

SHANKAR L. GOKHALE, OF SCHENECTADY, NEW YORK, ASSIGNOR TO GENERAL ELECTRIC COMPANY, A CORPORATION OF NEW YORK.

DIRECT-READING FLUX METER.

Application filed July 30, 1920. Serial No. 400,160.

*To all whom it may concern:*

Be it known that I, SHANKAR L. GOKHALE, a citizen of the United States, residing at Schenectady, county of Schenectady, State of New York, have invented certain new and useful Improvements in Direct-Reading Flux Meters, of which the following is a specification.

This invention relates to flux meters and more particularly to flux meters used for the determination of hysteresis loops.

The most common method for determining the amount of magnetic induction consists in using an indicating ballistic galvanometer connected to a coil wound around the material under test. As the magnetizing force is varied, the corresponding change in magnetic induction is determined from the throw of the galvanometer, which is proportional to this change in magnetic induction. The disadvantage of such a method is that each change in magnetic induction is measured separately, since the throw of the ballistic galvanometer is dependent merely upon the change of magnetic induction. This method is usually designated the step-by-step method. Furthermore, the throw of a ballistic galvanometer becomes less accurate when it is measuring large changes in magnetic induction. The ballistic galvanometer method as described briefly above may be sufficiently accurate for ordinary hysteresis loop determination, but this method has inherent disadvantages which make it unsuitable to plot unsymmetrical hysteresis loops.

Recently it has become highly important to plot these loops, since it is possible thereby to foretell accurately the performance of such apparatus as induction motors, there being in such motors an unsymmetrical magnetization in the teeth of the rotor and the stator. It is the main object of my invention to make it possible to plot these unsymmetrical loops with a higher degree of accuracy than has been possible heretofore. Prior to my invention the factors of design depending upon these unsymmetrical loops present in the induction motor magnetic circuit were obtained in a more or less haphazard manner.

Broadly considered, my invention comprises the employment of an indicating instrument so arranged as to be sensitive to the change in magnetic induction, corresponding to a change in the magnetizing or inducing force, in conjunction with means for producing an opposing flow of electrical current to keep the pointer at zero and thus to leave the instrument undeflected. The quantity of electrical current which is used to keep the pointer at zero is used as an indication of the change in induction. To produce this opposing flow of current, appropriate mechanical means may be used, and in order that a greater degree of accuracy may be obtained and also in order that there may be sufficient time allowed to manipulate this means I preferably use a highly damped ballistic galvanometer such as is commonly called a Grassot flux meter. Such an instrument is well known and is described in the London Electrician of Dec. 26, 1902, in an article written by R. Beattie. This instrument has this peculiarity, that its pointer in response to a flow of a definite quantity of current will move to a definite point on the scale and will not move away from there except at a very slow rate. This is true whether the current be produced suddenly or gradually. If the current is produced suddenly, the galvanometer needle will move suddenly and if the current is produced gradually the needle will move gradually. When the current stops flowing the needle will stop and its change in position will be proportional to the integrated quantity of current which passed through its coil.

For the purpose of creating the opposing flow of current I preferably employ a Faraday disc arranged to be manually rotated and to set up a flow of current in response to this rotation. It is found that with the type of indicating instrument mentioned hereinbefore it is possible to keep the indicator therof at the zero point (upon a change of induction) by a manual rotation of the disc. It is immaterial whether the disc be rotated suddenly or slowly because the integrated quantity of current produced would be the same for any given amount of rotation. When the disc is stationary in any position the voltage produced thereby will be zero and the distance the disc has moved will be an integration of the voltage produced during such movement. If the total integrated voltage thus produced is equal and opposite to the total integrated voltage produced across its terminals by a change in the magnetic induction, the algebraic sum of the currents flowing through the circuit will be zero and the galvanometer needle will stand on zero while the total amount of rotation of the Faraday disc will be an indication of the total change in magnetic induction. Therefore this method is a great deal more accurate than the well known step-by-step method, since the Faraday disc integrates its rotation from the beginning to the end of the test. The use of a Faraday disc also has the advantage that its angular displacement to produce the flow of current is proportional to the change of magnetic induction and the scale indicating the angular rotation may be arranged to read the change in magnetic induction directly.

The construction and mode of operation of my invention may be understood by reference to the accompanying drawing, in which the single figure is a wiring diagram, showing how the various instrumentalities are connected.

Referring now more in detail to the drawing, I designate the test sample by the numeral 1. This test sample is shown as of the usual ring form wound with two coils, the primary 2 being connected by means of a switch 3 to a source of current such as the battery 4. This switch 3 is adapted also to reverse the flow of current to the primary coil 2, and coarse and fine rheostats 5 and 6 are inserted in series with the battery 4 to regulate or vary the flow of current and thereby the magnetizing force (H). An ammeter 7 is appropriately connected for indicating the strength of current flowing through the coil 2. The secondary coil 8 which is shown in this instance as bridged by a variable shunt resistance 9 is connected in series with an adjustable resistance 19, the highly damped ballistic galvanometer 10, and a Faraday disc 11. This Faraday disc comprises a rotatable disc portion 12 placed in the fields of two permanent magnets 13 and 14 and adapted to be rotated manually by means of the knob 15. The upper pole of magnet 13 will be of the opposite polarity to the upper pole of magnet 14, so that the electromotive forces generated due to these two magnets will be in the same direction across the disc. A stationary pointer 16 cooperating with the figures marked upon the disc 12 serves to show the amount of angular rotation of the disc from the zero position. In order to lead out the current which flows in response to a rotation of the disc 12, I employ a pair of spring fingers 17 and 18 bearing on the outer periphery of the disc 12. These spring fingers 17 and 18 are connected into a circuit comprising the secondary coil 8 and the indicating instrument 10.

The mode of operation of my invention is as follows: In order to determine the number of lines of magnetic induction threading the test sample 1 which corresponds to the magnetizing or inducing force produced by the primary coil 2, assume first of all that no current is sent through this primary coil. Then, a very small current is allowed to pass therethrough by proper manipulation of rheostats 5 and 6. At the same time, the disc 12 is rotated manually in the proper direction to prevent a throw of the needle of the instrument 10. This needle thus serves to indicate the balance between the two quantities of current produced by the change in the magnetizing force and the rotation of the disc. Ordinarily this needle would move to a position proportional to the amount of electricity flowing through the secondary coil 8. By keeping the needle of the instrument 10 at or near zero at all times, errors due to large needle throw are entirely eliminated and the results are much more accurate. For comparatively small changes in magnetic induction it is not necessary to rotate the disc 12 simultaneously with the change in the magnetizing or inducing force, but it may be rotated either after or before the needle moves. It is of course evident that the disc 12 is never brought back to the zero position during a given measurement but a step-by-step rotation is produced and the total amount of its rotation serves as an indication of the total magnetic flux threading the test sample 1. Sometimes it is preferable to alternate the two acts of varying the inducing force and the rotation of the disc 12. If the inducing force be varied first, then the disc 12 is rotated say, in a clockwise direction to bring the needle of the instrument 10 back to zero. Then, if the disc 12 be rotated first in the same direction as before, the needle of the indication instrument 10 will move in the opposite direction to that in which it is moved in response to a change in the magnetizing force. After the needle of the instrument 10 is thus deflected the magnetizing force is varied until the needle returns to its central zero position. After the maximum magnetization is obtained the magnetizing force may be gradually reduced in order that a complete cycle may be obtained. This cycle may be either symmetrical or unsymmetrical.

It is of course to be understood that my invention may be utilized for any of the well known tests on magnetic material. While I have shown in the accompanying drawing the preferred embodiment of my invention, I do not wish to be limited thereto but aim to embrace in the accompanying claims all modifications falling fairly within the scope of my invention.

What I claim as new and desire to secure by Letters Patent of the United States, is,

1. The method of measuring magnetic induction which consists in varying the magnetizing force, thereby producing a corresponding change in induction, using said change to influence an indicating instrument, creating an opposing flow of electric current to keep said indicating instrument undeflected, and measuring the quantity of said opposing flow of current.

2. The method of measuring magnetic induction which consists in varying the magnetizing force, thereby producing a corresponding change in induction, using said change to influence an instrument adapted to measure quantity of electricity, creating an opposing flow of current by conversion of mechanical work into electrical energy, to keep said indicating instrument undeflected, and measuring the quantity of the opposing flow of current.

3. Means for measuring magnetic induction comprising in combination, means for varying the magnetizing force, a coil linking the magnetic flux, an instrument adapted to measure the quantity of electricity flowing through said coil, means for causing an opposing flow of electric current to keep said instrument undeflected when the magnetizing force is changed, and means for determining the amount of the opposing current.

4. Means for measuring magnetic induction comprising, in combination, means for varying the magnetizing force, a coil linking the magnetic flux, a highly damped ballistic galvanometer connected in series with said coil, a rotatable Faraday disc connected to said instrument, whereby said instrument may be kept undeflected when the magnetizing force is changed, and means for reading the flux change as a function of the amount of rotation of said disc.

5. Means for measuring magnetic induction comprising, in combination, a coil linking the magnetic flux, means for varying the magnetizing force, whereby a current tends to flow in said coil, a relatively movable scale and pointer adapted to be operated manually, means also operated by the relative movement for setting up an opposing flow of current through the coil when the magnetizing force is varied, and means for indicating the balance between the two quantities of current.

6. Means for measuring magnetic induction comprising, in combination, an instrument sensitive to variations in the magnetic flux, means for varying the magnetizing force, means manually operated by a movement in the same direction for each corresponding variation of the magnetizing force to keep said instrument undeflected, and means for measuring the total movement.

In witness whereof, I have hereunto set my hand this 28th day of July, 1920.

SHANKAR L. GOKHALE.